(12) United States Patent
Zansky et al.

(10) Patent No.: US 7,034,413 B1
(45) Date of Patent: Apr. 25, 2006

(54) HOLDUP TIME EXTENDER AND INRUSH CURRENT ELIMINATOR FOR SWITCHING POWER SUPPLIES

(75) Inventors: Zoltan Zansky, San Carlos, CA (US); Bill Jacobsen, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 210 days.

(21) Appl. No.: 10/217,039

(22) Filed: Aug. 12, 2002

(51) Int. Cl.
*H02J 7/00* (2006.01)

(52) U.S. Cl. .......................................... 307/66; 307/48
(58) Field of Classification Search ................. 363/15, 363/16, 21.01, 21.04, 21.12, 95, 97; 323/908; 361/93.9; 307/46, 48, 64, 66
See application file for complete search history.

(56) References Cited

U.S. PATENT DOCUMENTS

| | | | | |
|---|---|---|---|---|
| 4,395,639 A | * | 7/1983 | Bring ........................... | 307/66 |
| 4,745,299 A | * | 5/1988 | Eng et al. ..................... | 307/66 |
| 5,115,185 A | * | 5/1992 | Fraidlin et al. ............. | 323/207 |
| 5,909,360 A | * | 6/1999 | Lavin et al. .................. | 307/66 |
| 6,504,270 B1 | * | 1/2003 | Matsushita ................... | 307/140 |
| 6,819,072 B1 | * | 11/2004 | White et al. ................ | 318/560 |

* cited by examiner

*Primary Examiner*—Gary L Laxton
(74) *Attorney, Agent, or Firm*—Suiter West Swantz pc llo

(57) ABSTRACT

The present invention is a method and system for supplementing power when a power supply has a power failure. An amount of inrush current produced upon resumption of input power is reduced. Supplemental power circuitry may include a rechargeable battery that may supply power during a power failure without generating a large inrush current when input power is regained. The period of time supplemental power may be provided is also increased.

10 Claims, 3 Drawing Sheets

HOLDUP TIME EXTENDER AND INRUSH CURRENT ELIMINATOR FOR SWITCHING POWER SUPPLIES

FIELD OF THE INVENTION

The present invention generally relates to the field of power supplies, and more particularly to a method and system for extending the holdup time and reducing the inrush current of a power supply.

BACKGROUND OF THE INVENTION

Conventional power supplies known to the art typically employ two methods of recovery during a power failure. For a short input power failure (typically less than 20 milliseconds), large capacitors may be utilized with a converter to supplement input power. When an input power supply is interrupted for a period of greater than 20 milliseconds, uninterruptable power supply (UPS) equipment external to the power supply is necessary.

When large capacitors are utilized to supplement input power for short power failures, a large inrush current is produced when input power is regained. This requires additional circuitry, typically an inrush current limiting resistor and a relay or transistor with control circuitry, to accommodate the inrush current which adds cost to the power supply. The incorporation of UPS equipment with a power supply also adds cost to the power supply. Consequently, a method and system of supplementing input power during a power failure that may not produce an inrush current is necessary.

SUMMARY OF THE INVENTION

Accordingly, the present invention is directed to a method and system for supplementing input power during a power failure that minimizes the amount of inrush current upon resumption of input power. In an embodiment of the invention, supplemental power circuitry may include a rechargeable battery that may supply power during a power failure without generating a large inrush current when input power is regained. In an advantageous aspect of the present invention, the supplemental power circuitry of the present invention may provide power for a period of time greater than conventional circuitry, providing power for a period of time greater than twenty milliseconds and may be greater than two minutes depending upon a selected battery capacity.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
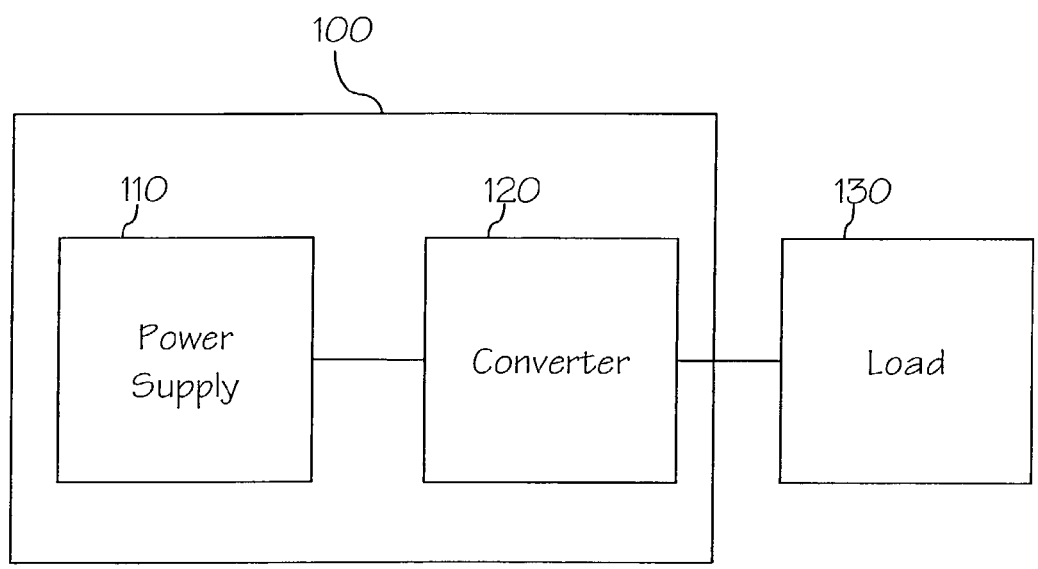
FIG. 1 depicts a power supply system in accordance with an embodiment of the present invention.

Referring to FIG. 1, a power supply system 100 in accordance with an embodiment of the present invention is shown. In an embodiment of the invention, power supply system 100 may include a power supply 110 and a converter 120 and is capable of providing a desired supply to load 130. Power supply 110 may produce alternating current (AC) power and direct current (DC) power. In an embodiment of the invention, power supply 110 may be a switching power supply that may utilize power semiconductor switches in the on and off switching states.

Converter 120 may be utilized to convert an AC supply to a DC supply and may also convert an unregulated DC supply to a regulated or variable DC supply. In an embodiment of the invention, converter 120 may be a forward converter suitable for conversion of high power. Converter 120, in an embodiment of the invention, may supplement input power provided by power supply 110 if power supply 110 should temporarily fail. An advantageous aspect of the present invention is the ability of converter 120 to supplement power during a power failure without generating a large inrush current when the power supply 110 regains operability. In one embodiment of the invention, converter 120 may employ a rechargeable battery in lieu of large capacitors to supplement power during a power failure. Although the embodiment of the power supply system 100 shown in FIG. 1 includes a separate power supply 100 and converter 120, it should be understood by those with ordinary skill in the art that circuitry of a power supply 100 and converter 120 may be incorporated within a single product without departing from the scope and spirit of the present invention.

Figure 2:
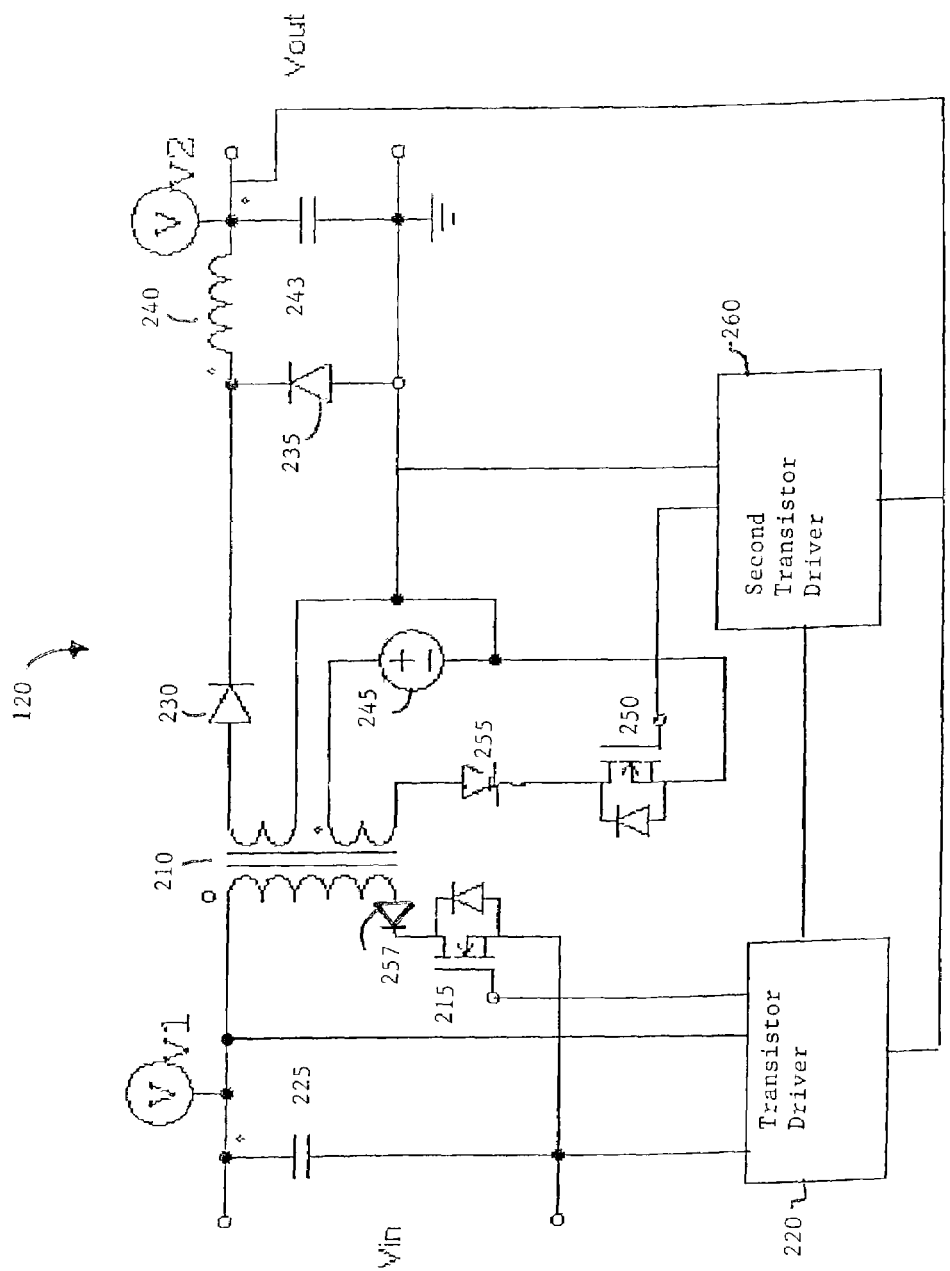
FIG. 2 depicts a converter in accordance with an embodiment of the present invention.

Referring now to FIG. 2, a converter 120 in accordance with an embodiment of the present invention is shown. Converter 120 may be representative of the converter of the power supply system 100 of FIG. 1. Converter 120 may include conventional forward converter components of a transformer 210, a transistor 215, a transistor driver 220, an input capacitance 225, diodes 230–235, an inductor 240, and an output capacitance 243. In accordance with the present invention, input capacitance 225 may be a small capacitance, such as 1 microFarad compared with conventional holdup capacitors known to the art of 100–1000 microFarads. Additionally, converter 120 of the present invention may include a second transistor 250, a second transistor driver 260, diodes 255 and 257, and rechargeable battery 245. While converter 120 is illustrated as a forward converter, it should be understood by those with ordinary skill in the art that other types of converters may be equipped with a rechargeable battery in accordance with the present invention without departing from the scope and spirit of the present invention.

While transistors 215 and 250 are shown as field effect transistors, it should be understood by those with ordinary skill in the art that other types of transistors may be utilized in accordance with the present invention without departing from the scope and spirit of the present invention. Transistor driver 220 and second transistor driver 260 may include a Unitrode UC3842 device or a similar integrated circuit along with voltage sense circuitry and logic.

Turning now to the operation of converter 120, if the voltage at node V1 should drop for a specified time period, first transistor driver 220 may sense the dropped voltage and may turn transistor 215 off. First transistor driver 220 may also turn second transistor driver 260 on. As a result, transformer 210 may be powered by rechargeable battery 245. In an embodiment of the invention, rechargeable battery 245 may be a low voltage battery (12 volts or less). However, rechargeable battery 245, even at 12 volts, may be suitable for providing supplemental power for a 48 Volt power supply as utilized in the converter circuitry. This is advantageous as low voltage batteries may occupy less space than high voltage batteries such as 48 Volt batteries. It should be understood by those with ordinary skill in the art that high voltage batteries may be utilized in accordance with the present invention without departing from the scope and spirit of the present invention.

When the Vin input is restored, the circuitry may return to "regular power" operation. Second transistor driver 260 may provide power to rechargeable battery 245 to allow recharging of the battery 245. Since input capacitance is such a small value, the amount of inrush current is negligible and inrush current limiting circuitry may not be required.

An advantageous aspect of the present invention is the increased amount of time supplemental power may be provided by converter 120 of the present invention. Conventional converters employing large capacitors could only provide supplemental power for a period of time to discharge current from the capacitors. Typically, conventional converters could provide supplemental power for approximately twenty milliseconds. Use of a rechargeable battery in accordance with the present invention may allow an increased period of time for supplemental power. For example, supplemental power may be provided by converter 120 of the present invention for a period of time greater than twenty milliseconds and ever greater than two minutes depending on a selected battery capacity.

Another advantageous aspect of the present invention is the ability of converter 120 to drive two isolated windings of transformer 210. Converter circuitry of transistor 215 and transistor driver 220 drive one winding while converter circuitry of transistor 250 and second transistor driver 260 drive another winding of transformer 210. This is advantageous as only one transformer is required wherein converters known to the art require two transformers. This may reduce cost associated with manufacture of the converter along with a reduction in the area occupied by converter 120.

Figure 3:
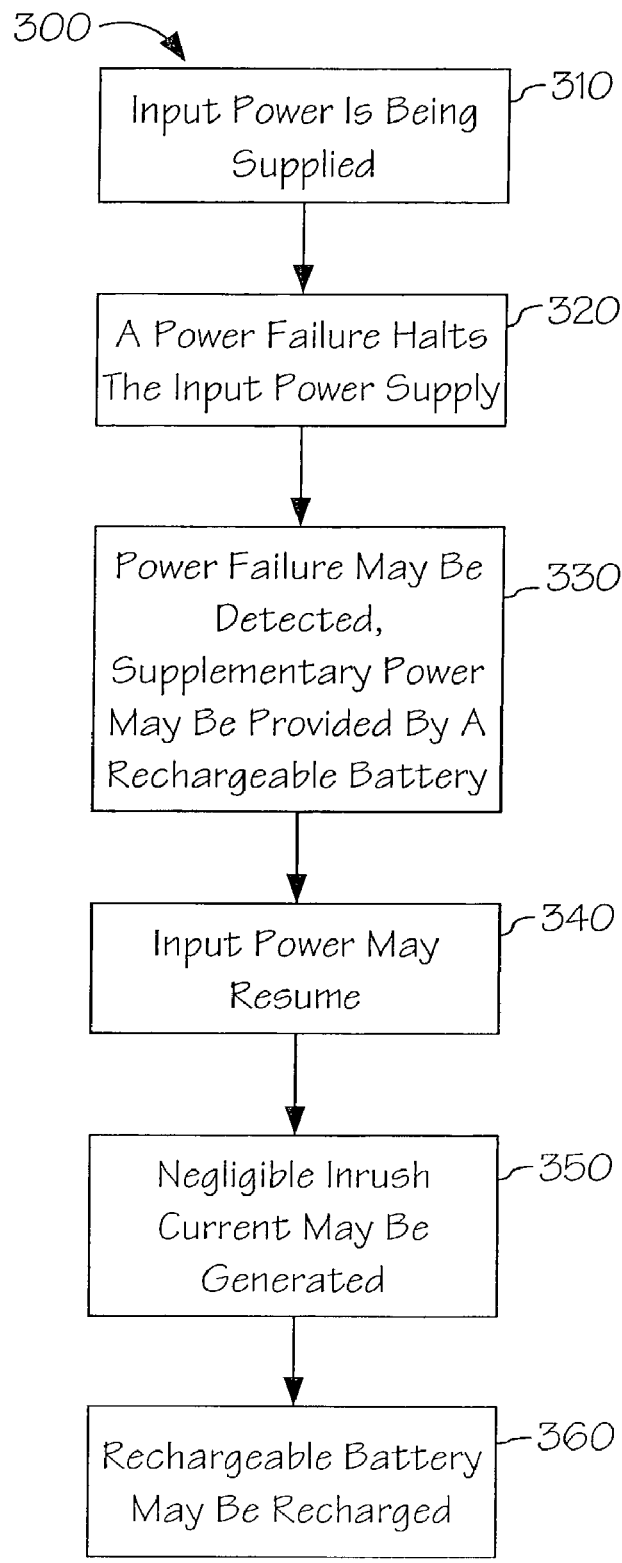
FIG. 3 depicts a process for supplementing power during a power failure in accordance with an embodiment of the present invention.

Referring to FIG. 3, a process 300 for supplementing power during a power failure in accordance with an embodiment of the present invention is shown. Process 300 may be performed by converter 120 of FIGS. 1–2 in order to supplement power during a power outage event. Process 300 may begin as input power is being supplied 310. A power failure in the power supply may halt the input power supply 320. The power failure may be detected, and supplemental power may be provided by a rechargeable battery 330.

When input power is regained 340, negligible inrush current may be generated 350 on account of a low input capacitance of converter 120 of the present invention. Additionally, when input power is regained the rechargeable battery may be recharged 360. This is advantageous as it may allow the rechargeable battery to supplement power during subsequent power failures.

While FIGS. 1–3 and the related description depict the supplementation of power via a rechargeable battery, it should be understood by those with ordinary skill in the art that this only represents an embodiment of the invention wherein the invention includes the supplementation of power which minimizes an amount of inrush current and increases holdup time. It is believed that the system and method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A power supply system, comprising:
   a power supply providing an input voltage;
   a single transformer coupled to said input voltage; said transformer including a first, second, and third winding;
   a capacitance across said input voltage;
   a first transistor driver coupled to said input voltage;
   a rechargeable battery coupled to said second winding of said transformer; and
   a second transistor driver coupled to said first transistor driver, wherein said single transformer provides an output voltage across said third winding, said first transistor driver being capable of detecting a reduced voltage of said input voltage, when a reduced voltage is detected, said first transistor driver signals said second transistor driver whereby said output voltage is provided by said capacitance across said first winding and said rechargeable battery across said second winding.

2. The power supply system as claimed in claim 1, wherein said second transistor driver operates to allow said input voltage to recharge said rechargeable battery upon resumption of power from said power supply.

3. The power supply system as claimed in claim 1, wherein said rechargeable battery is capable of providing supplemental power for a period of time greater than two minutes.

4. The system as claimed in claim 1, wherein said capacitance is less than or equal to one microFarad.

5. The power supply system as claimed in claim 1, wherein an amount of inrush current, produced by said capacitance upon resumption of power from said power supply, is negligible.

6. A power supply system, comprising:
   a power supply providing an input voltage;
   a single transformer coupled directly to said input voltage; said transformer including a first, second, and third winding, said input voltage being coupled to said first winding;
   a capacitance across said input voltage;
   a first transistor driver coupled to said input voltage;
   a first transistor coupled to said first transistor driver;
   a rechargeable battery coupled to said second winding of said transformer;
   a second transistor driver coupled to said first transistor driver; and
   a second transistor coupled to said second transistor driver, wherein said single transformer provides an output voltage across said third winding, said first transistor driver being capable of detecting a reduced voltage of said input voltage, when a reduced voltage is detected, said first transistor driver turns the first transistor off and signals said second transistor driver which turns the second transistor on whereby said output voltage is provided by said capacitance across said first winding and said rechargeable battery across said second winding.

7. The power supply system as claimed in claim 6, wherein said second transistor driver operates to allow said input voltage to recharge said rechargeable battery upon resumption of power from said power supply.

8. The power supply system as claimed in claim 6, wherein said rechargeable battery is capable of providing supplemental power for a period of time greater than two minutes.

9. The power supply system as claimed in claim 6, wherein said capacitance is less than or equal to one microFarad.

10. The power supply system as claimed in claim 6, wherein an amount of inrush current, produced by said capacitance upon resumption of power from said power supply, is negligible.

\* \* \* \* \*